May 16, 1961  R. CLIBORN  2,984,751
INTEGRAL TURBINE-GENERATOR UNIT
Filed July 28, 1958  3 Sheets-Sheet 1

Inventor
ROBERT CLIBORN
by Hill, Sherman, Meroni, Gross & Simpson Attys

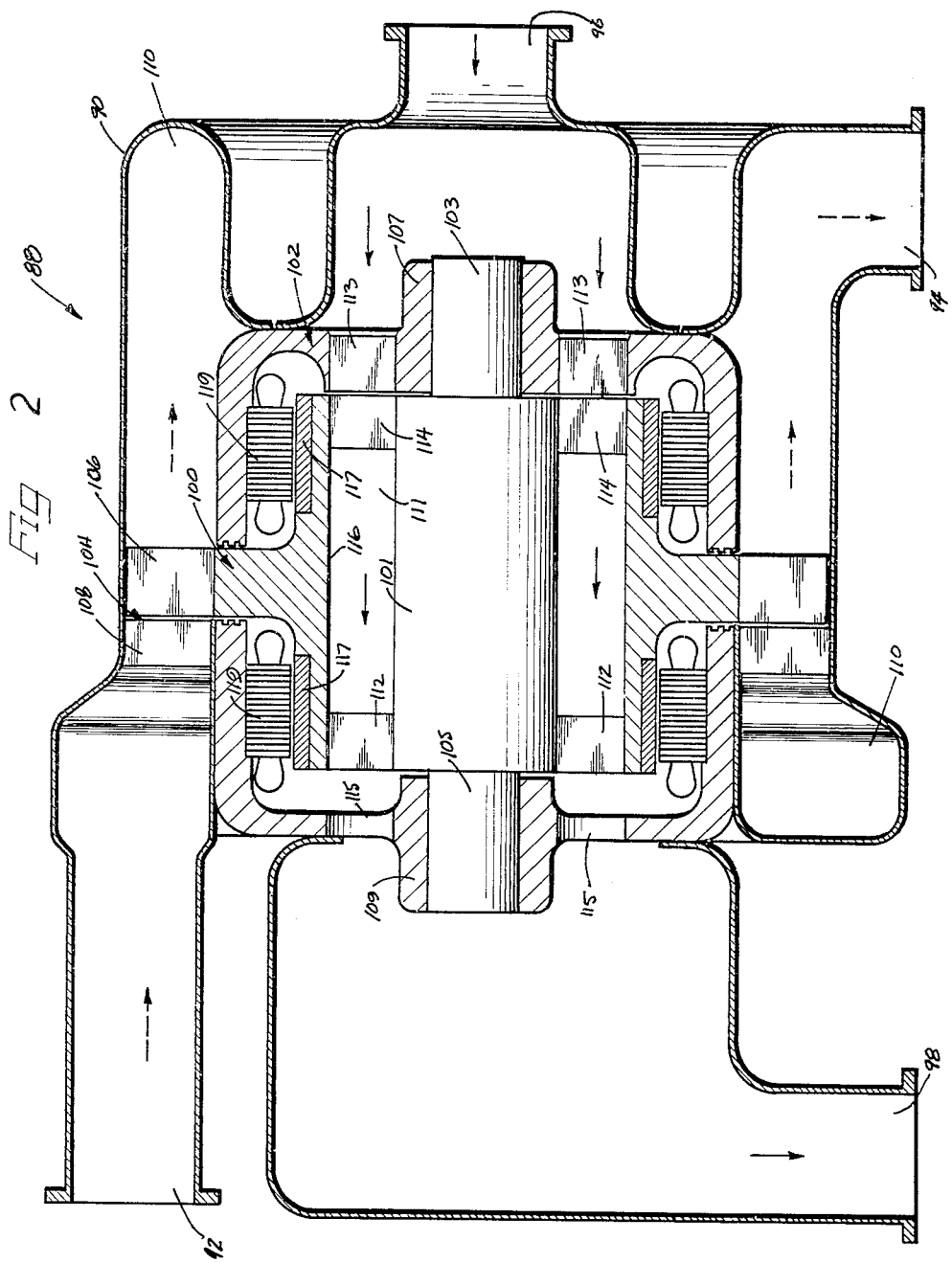

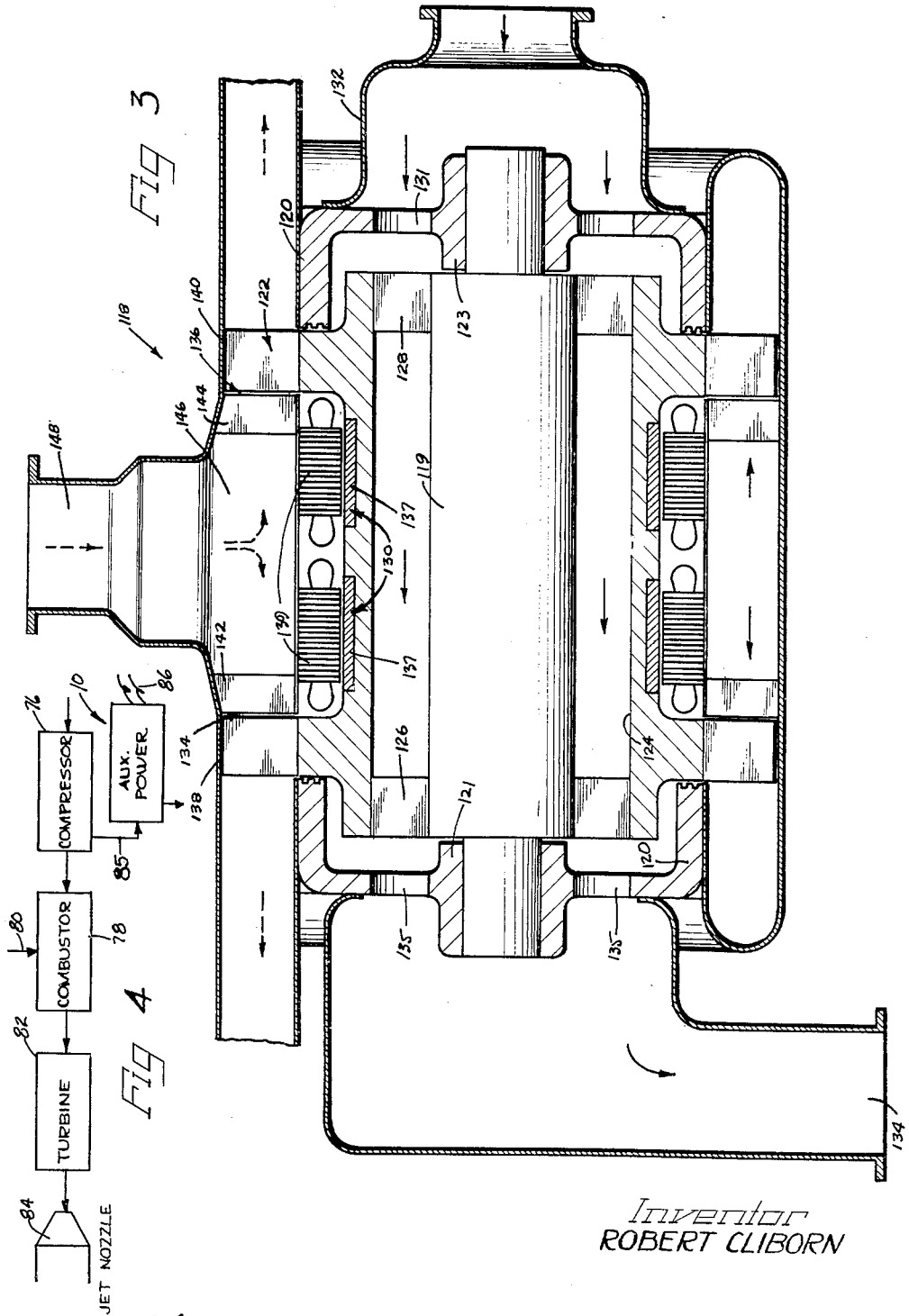

United States Patent Office 2,984,751
Patented May 16, 1961

2,984,751
INTEGRAL TURBINE-GENERATOR UNIT

Robert Cliborn, South Euclid, Ohio, assignor to Thompson Ramo Wooldridge Inc., a corporation of Ohio Filed July 28, 1958, Ser. No. 751,516

1 Claim. (Cl. 290—52)

The present invention relates to turbine operated generator units and particularly to a combined turbine and generator unit which has an improved system for utilizing a flow of high pressure air or burning gases for driving the turbine and for utilizing a flow of cooling air for cooling the generator.

The features of the invention are especially well adapted to such use as for an auxiliary power unit for generating electricity for a turbine operated or jet propelled aircraft. The invention contemplates the provision of a turbine and generator combined as a unit and enclosed in a housing provided with an inlet passage for operating fluid for driving the turbine and an exhaust passage for the exhaust of the operating fluid. Where compressed air is utilized as an operating fluid the exhaust is recirculated and is utilized to drive additional turbine blades and used as a coolant for the generator. In an alternate form heated operating fluid is employed and the turbine rotor carries fan blades for pumping cooling air through the generator. The housing encloses a single rotor with turbine blades mounted on the periphery and turbine nozzles positioned to direct the flow of operating fluid axially to drive the rotor. The rotor also carries a generator armature and a coacting field is mounted within the housing. The rotor is provided with axial flow passages for the flow of the exhaust operating fluid or a separate coolant.

Accordingly, it is an object of the present invention to provide an improved generator and turbine driving the generator combined in a compact unit and constructed in an improved manner for uses such as providing auxiliary electrical power for aircraft.

Another object of the invention is to provide a turbine generator unit with an improved mechanism for cooling the generator.

Another object of the invention is to provide an air driven turbine generator unit which may be driven from compressed air bled from the compressor of a turbo generator unit and wherein the turbine operating air exhaust is utilized for obtaining further power and for cooling the turbine.

A still further object of the invention is to provide an improved turbine generator unit of balanced construction wherein unstabilizing thrust forces are eliminated for improved operation of both the turbine and generator members.

Other objects and advantages will become more apparent from the teachings of the principles of the invention in connection with the disclosure and showing thereof in the specification and claim and drawings, in which:

Figure 2 is a vertical sectional view taken through a turbine and generator unit and showing another form of the invention;

Figure 3 is a vertical sectional view taken through a turbine and generator unit constructed in accordance with the principles of the invention, illustrating a modified form of turbine construction; and Figure 4 is a schematic illustration of a turbo-jet engine in combination with a turbine generator power unit of the present invention.

As shown on the drawings:

Figure 1:
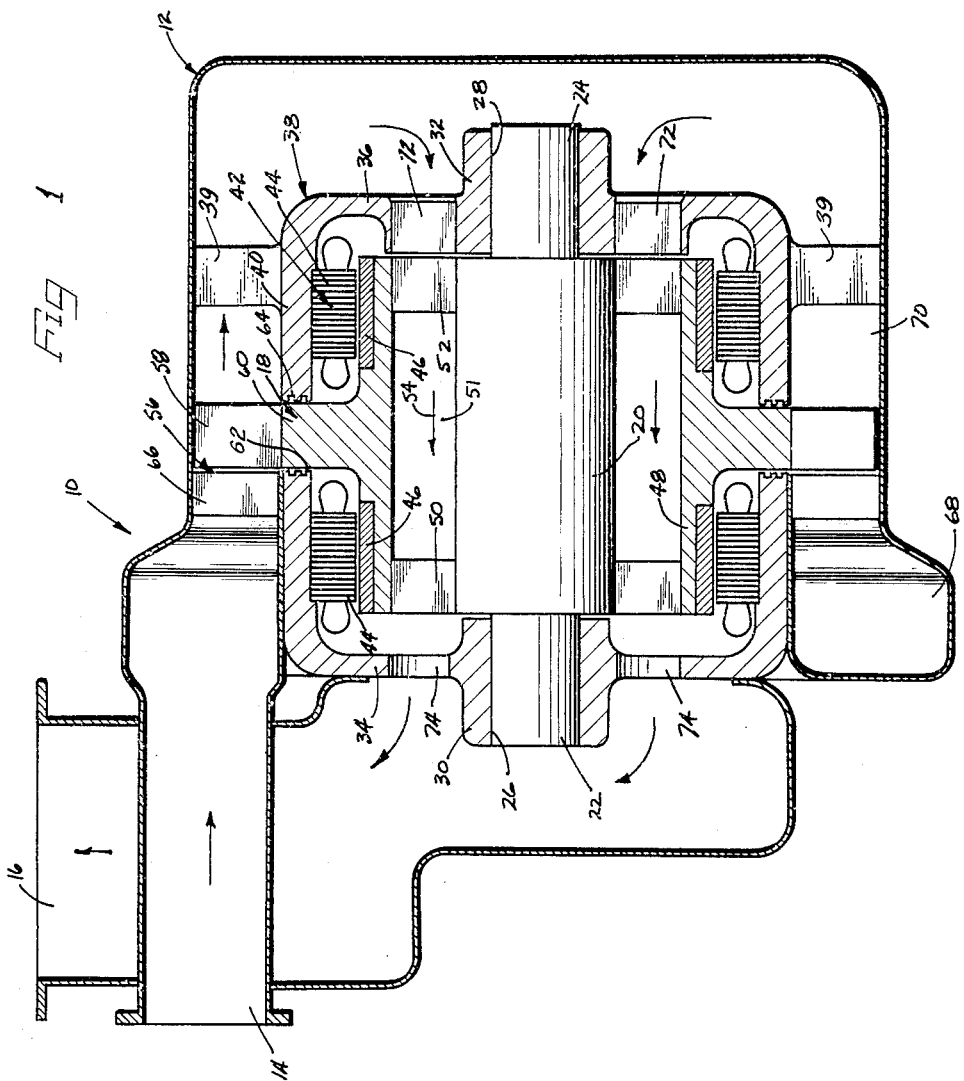
Figure 1 is a vertical sectional view taken through a turbine generator unit embodying the principles of the present invention.

A preferred form of the invention is illustrated in Figure 1 embodying a turbine and generator, formed as a single unit and capable of lightweight construction so as to be well adapted for use as an auxiliary power unit such as for supplying electrical energy for a jet propelled or turbo-jet propelled aircraft. The unit is shown enclosed within a turbine housing 12 which is provided with a gas inlet passage 14 and an exhaust passage 16. In the form of Figure 1, the turbine preferably utilizes compressed air as an operating medium and the compressed air is utilized further as a coolant before being exhausted through the exhaust passage 16.

Within the housing 12 is mounted a rotor 18. The rotor is carried on a shaft 20 shown as having reduced journal ends 22 and 24 rotatably mounted within bearings 26 and 28. The bearings 26 and 28 are formed in centrally located hubs 30 and 32 supported by end walls 34 and 36 of a cast generator housing part 38. The housing part 38 has an outer wall 40 which forms an enclosing shell for a generator 42. The unit is shown as preferably formed with the part 38 being cast and the turbine housing 12 forming the flow passages of shaped sheet metal. Ribs 39 project outwardly from the housing part 38 and are attached to the turbine housing 12.

The generator 42 is illustrated as having field elements 44 and armature elements 46. The field elements 42 are mounted inside of the annular wall 40 in an annular fashion to be in coacting generating relationship with the armature elements 46 which are mounted on a tubular sleeve portion 48 of the rotor.

This sleeve portion 48 is supported on the rotor shaft 20 by radially extending vanes 50 and 52 at the ends of the sleeve and these vanes are arranged circumferentially around the shaft part 20 of the rotor. The vanes 50 are tilted about their radial axis to permit free axial flow of air from the cooling space 51 in the rotor, as it rotates.

The vanes 52 are shaped to act as turbine blades and be driven by air discharged from nozzle vanes 72 around the hub 32.

The rotor 18 is primarily driven by a turbine 56. The turbine has rotor blades 58 which are carried on the periphery of a rotor flange 60 projecting out and integral with the rotor sleeve 48. The annular shell 40 is provided with annular seals 62 and 64 to prevent the escape of pressurized air as it passes through the turbine.

The turbine is provided with annularly disposed nozzle or stator vanes 66 which direct the air against the vanes 58 for driving the rotor in rotation. The housing 12 is formed so that the inlet passage 14 leads to an annular chamber 68 which directs the flow of pressurized operating air to the nozzle vanes 66.

As the air flows past the turbine the housing is formed with an annular chamber or duct 70 to receive the exhause of air and turn it inwardly to reverse in direction 180° and flow axially through the rotor in the opposite direction.

The exhaust air from the turbine vanes reverses and flows through the secondary nozzle vanes 72 and drives the vanes 52 to increase the driving force on the rotor 18. The exhaust air then acts as a coolant and picks up heat from the inner surface of the tubular part 48 of the rotor and is discharged through openings 74 in the end wall 34 to flow out through the exhaust passage 16. Thus the operating fluid is used to drive the turbine and is reversed in axial flow to drive the secondary turbine and is utilized as a coolant in reducing the operating temperature of the generator.

A combination employing the turbine generator unit 10 is illustrated in Figure 4. A power plant for an aircraft or the like is shown providing turbo-jet propulsion. A power driven compressor 76 delivers compressed air to a combustor 78 supplied with the fuel at 80. The operating gases from the combustor drive a main turbine 82 and the exhaust gases from the turbine eject out through a jet nozzle 84. The turbine is connected through a power shaft (not shown) to drive the compressor and may also be utilized to provide propeller power for the aircraft. A portion of the compressed air from the compressor is bled through a bleed line 85 to be delivered to the inlet 14 for operating the auxiliary power unit 10. Electrical power is delivered from the auxiliary power unit to leads such as 86 to operate controls and other equipment for the aircraft.

Figure 2 illustrates a unit which may be driven by an operating fluid such as a heated gas and wherein a separate source of cooling air is provided. In the unit 88 of Figure 2, a housing 90 is provided having an operating gas inlet 92 and an exhaust 94 for the gas. A cooling air inlet 96 leads into the housing and the cooling air discharges through a passage 98.

A rotor 100 is provided rotatably mounted within a shell 102 of construction similar to the mechanism of Figure 1. The rotor has a shaft 101 with ends 103 and 105 journaled in hubs 107 and 109 which are part of the shell.

The rotor 100 is driven by a turbine 104 having turbine rotor blades 106 mounted on the periphery of the rotor 100. Stator blades or nozzles 108 are positioned to receive a flow of operating gas from an annular chamber 110 connected to receive gas from the inlet 92. The exhaust gas from the turbine 104 flows to an annular manifold 110 which connects to discharge exhaust through the passage 94.

Cooling air is pumped axially through the rotor by tilted circumferentially spaced vanes 112 and 114 at the ends of the rotor and the cooling air passes through openings 113 outside of the hub 107 of the annular shell 102 to flow out through the cooling chamber 111. The air is exhausted through openings 115 outside of the hub 109 and out through the exhaust passage 98.

The rotor carries armature pieces 117 which coact with fields 119 in the shell to generate electricity.

Figure 3 illustrates a thrust balance assembly wherein the axial forces on the rotor are substantially balanced to insure continued axial alignment between the rotor and stator elements of the turbine and the armature and field of the generator 130 for improved overall operation. The generator has armature pieces 137 and windings 139. The unit 118 has a cast shell 120 with a rotor 122 mounted therein. The rotor is shown as having an axial coolant flow duct 124 extending therethrough for the flow of air. The rotor has a shaft 119 rotatably supported at its ends in hubs 121 and 123.

Vanes 126 and 128 mounted on the rotor pump air therethrough to aid in cooling the generator 130 and the air flows in through the air duct 132 through openings 131 in the shell 120, through opening 135 at the other end of the shell and flows out through an exhaust duct 134.

The rotor 122 is operated by a first turbine unit 134 and a second turbine unit 136. The first turbine unit has a series of turbine blades 138 mounted annularly around the rotor 122 and the second turbine 136 is provided with a series of similar blades 140 mounted around the periphery of the rotor. Mounted inwardly from each series of rotor blades 138 and 140 are stator nozzles or vanes 142 and 144. The nozzles face a flow dividing chamber 146 which receives a flow of operating gas from a passage 148. As the gas flows inwardly the flow splits to enter the turbines 134 and 136 and axial pressure on the turbine vanes is balanced inasmuch as it acts on opposite directions. This substantially eliminates axial thrust which must otherwise be compensated for by thrust bearings and which moves relative parts of the generator and turbine out of alignment.

In operation of the unit of Figure 1, an operating gas such as compressed air is delivered through the inlet passage 14 and drives the turbine, flowing through the nozzles 66 to act on the vanes 58 mounted on the rotor 18. The flow of compressed air is exhausted from the turbine and is turned axially to reverse itself and flow back through the rotor to drive the secondary turbine vanes 52. Thus the air functions as an operating fluid for the turbines and as a coolant for the generator 42 utilizing its cooling capacity as well as its pressure and flow intertia, and increasing the overall efficiency of the unit. Operation of the unit of Figure 2 is substantially similar with the exception that a hot burning gas may be used and a separate source provided for coolant. The rotor is utilized for driving the pumping vanes 112 for moving the coolant through the unit thereby containing a compact simplified unit.

Thus it will be seen that I have provided an improved turbine generator unit which meets the objectives and advantages hereinbefore set forth. The mechanism is simplified in construction and has improved performance and is well adapted to lightweight efficient operation such as is required and is useful in electrical auxiliary power units.

I have, in the drawings and specification, presented a detailed disclosure of the preferred embodiments of my invention, and it is to be understood that I do not intend to limit the invention to the specific forms disclosed, and intend to cover all modifications, changes and alternative constructions and methods falling within the scope of the principles taught by my invention.

I claim as my invention:

A turbine driven generator unit for operation by compressed air comprising in combination an outer annular housing part, an inner annular housing part defining with said outer part an annular flow chamber for compressed operating air, a rotor rotatably mounted within said inner housing part, turbine members on the rotor projecting radially outwardly through a radial gap in said inner housing part, turbine stator members adjacent the turbine members on the rotor and positioned between said housing parts in the annular flow chamber to direct compressed air to the turbine members on the rotor, an air supply conduit communicating with the annular flow chamber on an inlet end thereof so that the air will flow to an outlet end of the flow chamber, generator armature coils on the inner housing part on each side of the turbine rotor members, generator field members carried on the rotor on each side of the turbine rotor members, end walls on the inner housing part having axial flow openings therein, and means defining axial flow openings at both ends of said rotor in communication with the openings on said inner housing part so that air will flow from the outlet end of said annular flow chamber through the end walls at one end of said inner housing part and said rotor for cooling the interior of the rotor and the generator armature coils and field members and through the end walls at the other end of said inner housing part and said rotor.

References Cited in the file of this patent
UNITED STATES PATENTS

| | | |
|---|---|---|
| 2,024,531 | Lyons | Dec. 17, 1935 |
| 2,031,968 | Mathias | Feb. 25, 1936 |
| 2,511,854 | Kane | June 20, 1950 |